United States Patent
Takeuchi et al.

(10) Patent No.: US 11,526,522 B2
(45) Date of Patent: *Dec. 13, 2022

(54) COLLABORATIVE SEARCH OF DATABASES

(71) Applicant: International Business Machines Corporation, Armonk, NY (US)

(72) Inventors: Emiko Takeuchi, Tokyo (JP); Daisuke Takuma, Tokyo (JP); Hirobumi Toyoshima, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 349 days.

This patent is subject to a terminal disclaimer.

(21) Appl. No.: 16/691,644

(22) Filed: Nov. 22, 2019

(65) Prior Publication Data
US 2020/0089687 A1    Mar. 19, 2020

Related U.S. Application Data

(63) Continuation of application No. 15/599,633, filed on May 19, 2017, now Pat. No. 10,528,575, which is a
(Continued)

(51) Int. Cl.
*G06F 16/20* (2019.01)
*G06F 16/90* (2019.01)
*G06F 16/2457* (2019.01)
*G06F 16/248* (2019.01)
*G06F 16/951* (2019.01)
*G06F 16/27* (2019.01)

(52) U.S. Cl.
CPC ...... *G06F 16/24578* (2019.01); *G06F 16/248* (2019.01); *G06F 16/27* (2019.01); *G06F 16/951* (2019.01)

(58) Field of Classification Search
CPC .. G06F 16/24578; G06F 16/248; G06F 16/27; G06F 16/951
See application file for complete search history.

(56) References Cited

U.S. PATENT DOCUMENTS

| | | |
|---|---|---|
| 7,451,136 B2 | 11/2008 | Chua |
| 8,359,309 B1 | 1/2013 | Provine |

(Continued)

FOREIGN PATENT DOCUMENTS

| | | |
|---|---|---|
| JP | 2005258705 A | 9/2005 |
| JP | 2007234035 A | 9/2007 |

OTHER PUBLICATIONS

Appendix P—List of IBM Patents or Patent Applications Treated as Related, Filed herewith, 2 Pages.

*Primary Examiner* — Kristopher Andersen
(74) *Attorney, Agent, or Firm* — David S. Richart; Brian M. Restauro; Gavin Giraud

(57) ABSTRACT

A search query is received from a search engine of multiple search engines. One or more search results from each search engine of the multiple search engines in response to the search query are received. Each search result of the one or more search results includes a first search score. A factor is determined for each search result of the one or more search results. A second search score is determined for each search result of the one or more search results based on the first search score and the factor. The one or more search results are displayed to a user of the search engine in an order. The order is based on the second search score.

14 Claims, 3 Drawing Sheets

Related U.S. Application Data continuation of application No. 14/975,907, filed on Dec. 21, 2015, now Pat. No. 9,690,828.

(56) References Cited

U.S. PATENT DOCUMENTS

| | | |
|---|---|---|
| 8,538,946 B1 | 9/2013 | Thakur |
| 9,690,828 B1 | 6/2017 | Takeuchi |
| 2002/0049738 A1 | 4/2002 | Epstein |
| 2006/0041562 A1 | 2/2006 | Paczkowski |
| 2015/0095267 A1 | 4/2015 | Behere |
| 2017/0255631 A1 | 9/2017 | Takeuchi |

US 11,526,522 B2

COLLABORATIVE SEARCH OF DATABASES

BACKGROUND OF THE INVENTION

The present invention relates generally to the field of database management, and more particularly to searches of multiple shared databases.

A database, in general, is an organized collection of related data. For example, companies often maintain a database containing a collection of frequently asked question and associated answers. Access to data contained in a database is typically managed by computer software that provides access to all of the data contained in the database allows users to interact with the data. The software typically provides functions relating to the management of the database that include updating data (i.e., adding, modifying, and deleting data), data retrieval (i.e., providing data information in a form directly usable by other applications), and administration (i.e., registering users and monitoring use of the data base for security purposes).

SUMMARY

A search query is received from a search engine of multiple search engines. One or more search results from each search engine of the multiple search engines in response to the search query are received. Each search result of the one or more search results includes a first search score. A factor is determined for each search result of the one or more search results. A second search score is determined for each search result of the one or more search results based on the first search score and the factor. The one or more search results are displayed to a user of the search engine in an order. The order is based on the second search score.

DETAILED DESCRIPTION

Embodiments of the present invention recognize that answering questions from consumers can be a time-consuming and resource-consuming process for companies. Embodiments of the present invention recognize that it can be a time-consuming and frustrating process for a consumer to find the answer to a question related to a company, product, or service. For example, a consumer may have to separately search through multiple databases, such as collections of frequently asked questions and associated answers, in order to find the answer to a question. This process can be time-consuming and unsuccessful particularly where it is unclear to a consumer which company could answer the question most accurately. Such a situation may arise where multiple companies are active in similar or overlapping markets or where multiple companies are involved in similar products or services. For example, a question from a consumer regarding a mobile software application or a mobile device itself would be answered most accurately by the maker of the device or the software application developer as opposed to the telecommunications company used by the consumer.

Embodiments of the present invention provide techniques for a collaborative search of multiple databases across a network to provide ordered results to a search query originating from any of the databases.

Figure 1:
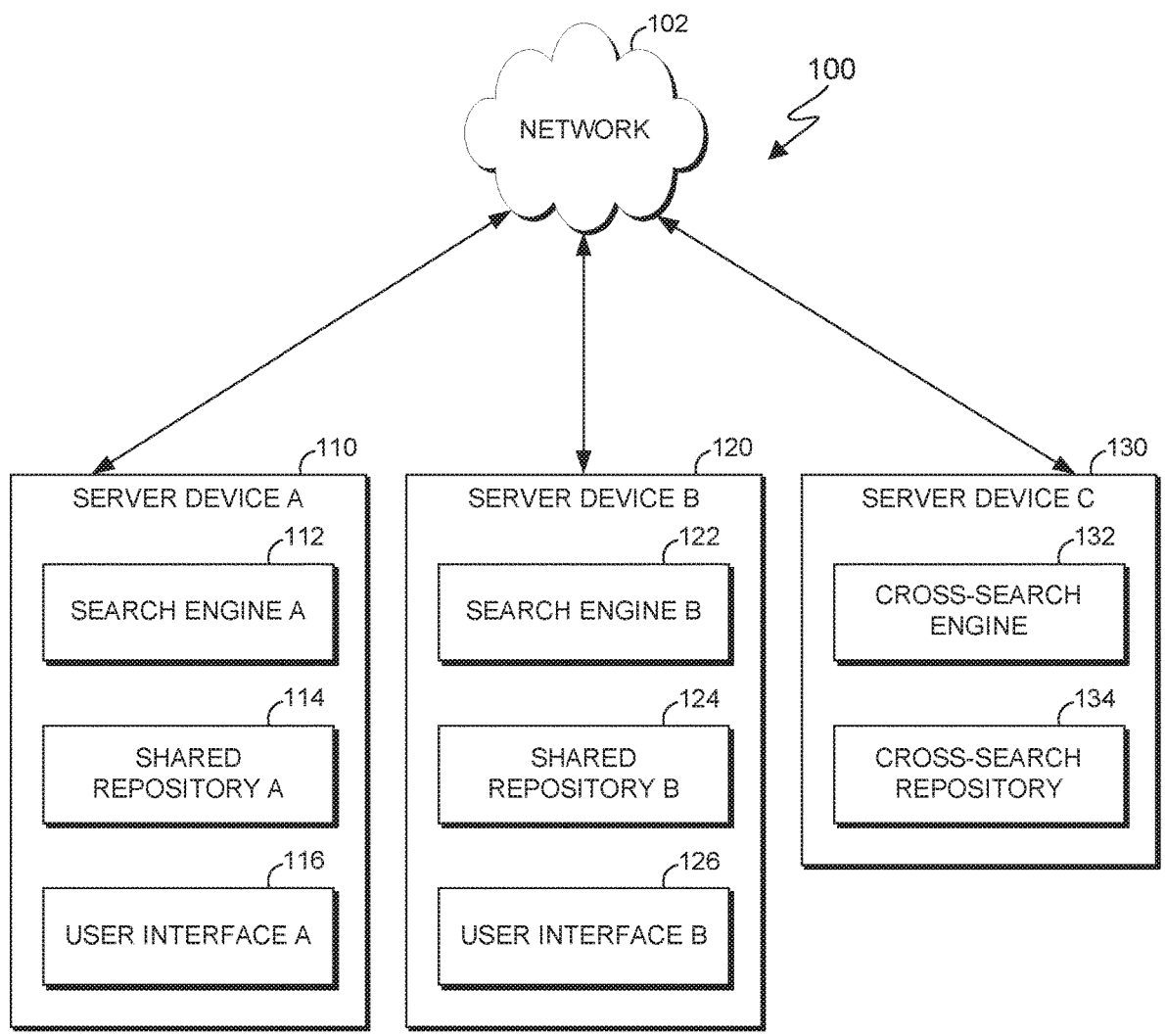
FIG. 1 is a functional block diagram of a distributed data processing environment, in accordance with an embodiment of the present invention.

The present invention will now be described in detail with reference to the Figures. FIG. 1 is a functional block diagram of a computing environment, generally designated 100, in accordance with an embodiment of the present invention. FIG. 1 provides only an illustration of one implementation and does not imply any limitations with regard to the environments in which different embodiments may be implemented. Those skilled in the art may make many modifications to the depicted environment without departing from the scope of the invention as recited by the claims.

In the illustrated embodiment, distributed data processing environment 100 includes server device A 110, server device B 120, and server device C 130. Server device A 110, server device B 120, and server device C 130 are interconnected through network 102. In an embodiment, distributed data processing environment 100 may include one or more additional devices (not shown) that are substantially similar to server device A 110 and server device B 120 or any other device.

In an embodiment, network 102 may generally be any combination of connections and protocols that supports communications between server device A 110, server device B 120, server device C 130 and any other computing device connected to network 102. In example embodiments, network 102 may be a local area network (LAN), a telecommunications network, a wide area network (WAN), such as the Internet, or any combination thereof. In an embodiment, network 102 may include wired, wireless, or fiber optic connections.

In an embodiment, server device A 110 may generally be any electronic device or combination of electronic devices capable of executing computer readable program instructions. In example embodiments, server device A 110 may be a personal computer, workstation, mobile phone, or personal digital assistant. In an embodiment, server device A 110 may be a computer system utilizing clustered computers and components, such as database server devices or application server devices, that act as a single pool of seamless resources when accessed by elements of distributed data processing environment 100, such as in a cloud computing environment. Server device A 110 may include components as depicted and described with respect to FIG. 3, in accordance with embodiments of the present invention. Server device B 120 and server device C 130 may be substantially similar to server device A 110.

In the illustrated embodiment, server device A 110 includes search engine A 112, shared repository A 114, and user interface A 116. In an alternative embodiment, search engine A 112, shared repository A 114, or user interface A 116 may be located on another computing device (not shown) connected to network 102, and search engine A 112, shared repository A 114, and user interface A 116 may communicate through network 102.

In an embodiment, search engine A 112 is any computer program, application, or subprogram of a larger computer program that searches shared repository A 114 and identifies items of information stored in shared repository A 114 that match a search query, in accordance with embodiments of the present invention. In an embodiment, the search query may be provided by a user through user interface A 116 or, alternatively, through user interface B 126. In an embodiment, the search query may be provided as, for example, text (e.g., words, phrases, questions), images, or sounds. In an embodiment, for each item in shared repository A 114 identified by search engine A 112 as a match to the search query, search engine A 112 assigns an item a search score based on how closely the item matches the search query. Search engine B 122 may be substantially similar to search engine A 112.

In an embodiment, shared repository A 114 contains items of information that are searched and identified by search engine A 112 according to a search query. In an embodiment, the items of information may be, for example, text information, image information, or sound information. In an embodiment, the items of information may be a collection of frequently asked questions and answers. For example, shared repository A 114 may contain a collection of frequently asked questions and answers for a mobile device company, and shared repository A 114 may contain the question "How do I use the memory backup service application?" and an associated explanation of how to use the memory backup service.

In an embodiment, shared repository A 114 may be implemented using any non-volatile storage media known in the art. For example, shared repository 114 may be implemented with a tape library, optical library, one or more independent hard disk drives, or multiple hard disk drives in a redundant array of independent disks (RAID). In an embodiment, shared repository A 114 may be implemented using any suitable storage architecture known in the art. For example, shared repository A 114 may be implemented with a relational database or an object-oriented database. Shared repository B 124 may be substantially similar to shared repository A 114. The term "shared repository" may refer to shared repository A 114, shared repository B 124, or any other repository (not shown) substantially similar to shared repository A 114 and shared repository B 124.

In an embodiment, user interface A 116 is the information, such as graphic, text, and sound, that search engine A 112 presents to a user and the control sequences the user employs to control and interact with search engine A 112. In an embodiment, user interface A 116 may be a graphical user interface (GUI) whereby user interface A 116 allows a user to interact with electronic devices, such as a keyboard or a mouse, through graphical icons and visual indicators, such as secondary notations, as opposed to text-based interfaces, typed command labels, or text navigation. GUIs were introduced for computers in response to the perceived steep learning curve of command-line interfaces, which required commands to be typed on the keyboard. A user may perform an action in user interface A 116 through direct manipulation of the graphical elements. User interface B 126 may be substantially similar to user interface A 116.

In an embodiment, cross-search engine 132 is any computer program, application, or subprogram of a larger computer program that directs search engine A 112 and search engine B 122 to perform searches according to a search query, revises the search scores of the resulting identified items using a share factor, and provides the items in an order corresponding to the revised search scores, in accordance with embodiments of the present invention. In an embodiment, cross-search engine 132 receives the search query from either user interface A 116 or user interface B 126 and directs both search engine A 112 and search engine B 122 to perform a search of shared repository A 114 and shared repository B 124, respectively, for items matching the criteria of the search query.

In an embodiment, cross-search repository 134 contains share factor information monitored and updated by cross-search engine 132. In an embodiment, the share factor information includes the number of times each item of a shared repository has been provided to a user and the number of times each item of a shared repository has been selected by a user. In an embodiment, the share factor information is stored and updated for each item of a shared repository. In an alternative embodiment, the share factor information is additionally stored and updated for each shared repository.

In an embodiment, cross-search repository 134 may be implemented using any non-volatile storage media known in the art. For example, cross-search repository 134 may be implemented with a tape library, optical library, one or more independent hard disk drives, or multiple hard disk drives in a redundant array of independent disks (RAID). In an embodiment, cross-search repository 134 may be implemented using any suitable storage architecture known in the art. For example, cross-search repository 134 may be implemented with a relational database or an object-oriented database.

Figure 2:
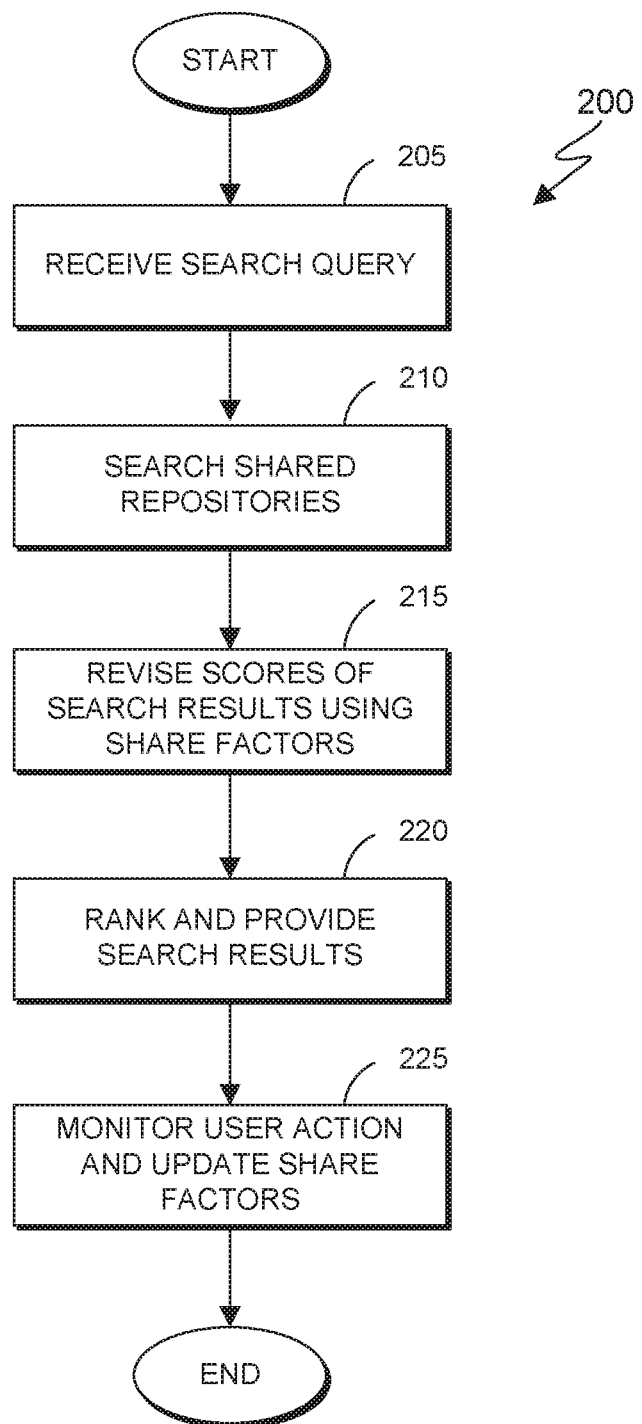
FIG. 2 is a flowchart of operational steps for providing ordered search results from multiple data sources shared across a network, in accordance with an embodiment of the present invention.

FIG. 2 is a flowchart of workflow 200 illustrating operational steps for providing ordered search results from multiple data sources shared across a network. In the illustrated embodiment, the steps of workflow 200 are performed by cross-search engine 132. In an alternative embodiment, the steps of workflow may be performed by any other computer program, or programs, while working with cross-search engine 132. In an embodiment, cross-search engine 132 begins performing the steps of workflow 200 in response to receiving an indication to provide ordered search results from shared repositories. For example, a user, through the user interface of server device C 130 (user interface not shown), may provide an indication to cross-search engine 132 to provide ordered search results for searches of shared repository A 114 and shared repository B 124.

Cross-search engine 132 receives a search query (step 205). In an embodiment, a user provides the search query through user interface A 116 or, alternatively, through user interface B 126. In an embodiment, the search query may be provided as, for example, text (e.g., words, phrases, questions), images, or sounds. As an example, a user may provide the search query "data backup on cloud" through user interface A 116.

Cross-search engine 132 searches shared repositories (step 210). In other words, in an embodiment, cross-search engine 132 directs search engine A 112 and search engine B 122 to perform searches of shared repository A 114 and shared repository B 124, respectively, and identify items of information that match or otherwise respond to the search query. In an embodiment, the items of information may be, for example, text information, image information, or sound information. In an embodiment, the items of information may be a collection of frequently asked questions and answers.

As an example, shared repository A 114 may contain a collection of frequently asked questions and answers for a mobile device company, and in response to searching shared repository A 114 according to the search query "data backup on cloud", search engine A 112 may identify the question "How do I use the cloud-based data backup application?" and an associated answer as an item that matches the search query. Additionally, shared repository B 124 may contain a collection of frequently asked questions and answers for a telecommunications company, and in response to searching shared repository B 124 according to the search query "data backup on cloud", search engine B 122 may identify the question "How do I upgrade my data plan?" and an associated answer as an item that matches the search query.

In an embodiment, search engine A 112 and search engine B 122 assign a search score to each item identified as a match to the search query based on how closely an item matches or otherwise responds to the search query criteria. In an embodiment, the search score may be a linear sum of the goodness of fit of various attributes (e.g., $a_1x_1+a_2x_2+a_3x_3$), or the search score may be based on a non-linear function (e.g., $1/(1+\exp(a_1x_1-a_2x_2-a_3x_3))$). Where the score is based on a non-linear function, cross-search engine 132 puts the score in the inverse function of the non-linear function. For example, where the score is based on the non-linear function: score=$1/(1+\exp(a_1x_1-a_2x_2-a_3x_3))$, cross-search engine 132 puts the score into the inverse function: score'=$-\log(1/(\text{score}-1))$. In this manner, a search score can be represented by a ratio scale in order to ensure that a value multiplied by a constant is a meaningful representation of the relative relevancy of the items.

Cross-search engine 132 revises scores of the search results using share factors (step 215). In other words, in an embodiment, cross-search engine 132, for each identified item, applies a share factor to the search score of an item. In an embodiment, a share factor is, in general, a value that reflects the likelihood of a user selecting an item that is contained in a shared repository other than the shared repository corresponding to the user interface through which the search query is received. For example, where cross-search engine 132 receives a search query from user interface A 116, and a search is performed by search engine A 112 and search engine B 122, the search scores of any items identified by search engine B 122 in shared repository B 124 are revised by cross-search engine 132 using a share factor, whereas the search scores of any items identified by search engine A 112 in shared repository A 114 are not revised using a share factor and remain unadjusted. In an embodiment, cross-search engine 132 determines a share factor using the share factor information stored in cross-search repository 134.

The shared repository that is associated with the user interface through which the current search query is received may be referred to as "query repository" (e.g., shared repository A 114 in the above example), and any other shared repository may be referred to as "non-query repository" (e.g., shared repository B 124 in the above example).

In an embodiment, a share factor is proportional to the number of times a particular item of a non-query repository has been selected by a user of a query repository and inversely proportional to the number of times the item has been provided to a user of the query repository. In an embodiment, a share factor is defined as the number of times a particular item of a non-query repository has been selected by a user of a query repository (S) divided by the number of times the item has been provided to a user of the query repository (D) (i.e., the value of a share factor for an item is S/D). In this manner, a share factor is associated with each item of a shared repository. In an alternative embodiment, a share factor is defined as the number of times any item of a particular non-query shared repository has been selected by a user of a query repository (S) divided by the number of times the items have been provided to a user of the query repository (D) (i.e., the value of a share factor for an item is S/D). In this manner, a share factor is associated with each shared repository. In other words, a share factor associated with a shared repository is used to revise the search scores for all items contained in the shared repository.

As an example, where user interface A 116 receives the search query "data backup on cloud", and search engine B 122 identifies the question "How do I upgrade my data plan?" and an associated answer (FAQ B item) as a matching item in shared repository B 124 and assigns FAQ B item a search score of 6, the share factor used by cross-search engine 132 to revise the search score may be the value of: the number of times FAQ B item has been selected by a user of shared repository A 114 divided by the number of times FAQ B item has been identified as a match and provided to a user of shared repository A 114. For example, where FAQ B item has been identified as a match and provided to a user of shared repository A 114 20 times (D) and has been selected by a user 5 of those times (S), the share factor of FAQ B item (S/D) is the value of 5 divided by 20, or 0.25, and the revised search score of FAQ B item is the search score (6) multiplied by the share factor (0.25), or 1.5.

In the same example, the share factor may alternatively be the value of: the number of times any item contained in shared repository B 124 has been selected by a user of shared repository A 114 divided by the number of times any item contained in shared repository B 124 has been identified as a match and provided to a user of shared repository A 114. For example, where items in shared repository B 124 have been identified and provided to a user of shared repository A 114 50 times (D) and have been selected by a user 10 of those times (S), the share factor of shared repository B 124 (S/D) is the value of 10 divided by 50, or 0.2, and the revised search score of FAQ B item is the search score (6) multiplied by the share factor (0.2), or 1.2.

Continuing the same example, where search engine A 112 identifies the question "How do I use the cloud-based data backup application?" and an associated answer (FAQ A item) as a matching item in shared repository A 114 and assigns FAQ A item a search score of 9, cross-search engine 132 does not revise the search score of FAQ A item using a share factor because shared repository A 114 is the query repository, thus the search score of FAQ A item remains 9.

Cross-search engine 132 ranks and provides the search results (step 220). In an embodiment, cross-search engine 132 ranks the items identified from the search based on the search score of each item, which may or may not have been revised by cross-search engine 132 in accordance with step 215. In an embodiment, the item with the highest search score is ranked first, and the item with the lowest search score is ranked last.

In an embodiment, cross-search engine 132 provides the identified items to a user through the same user interface through which cross-search engine 132 received the search query (i.e., in the illustrated embodiment, user interface A 116 or, alternatively, user interface B 126). In an embodiment, cross-search engine 132 provides the identified items in a ranked order. For example, cross-search engine 132 may provide the items in a list format where the highest-ranked item is the first item of the list and the lowest-ranked item is the last item of the list. In an embodiment, cross-search engine 132 may provide only a portion of the identified items. For example, cross-search engine 132 may provide only the five highest-ranked items, or cross-search engine 132 may provide only the highest twenty percent of the identified items.

In an embodiment, where cross-search engine 132 provides an item that is stored in a non-query shared repository, cross-search engine 132 may additionally provide an indication of the location in which the item is stored. For example, where a search query is received through user interface B 126, and search engine A 112 identifies as a matching item the question "How do I use the cloud-based data backup application?" and an associated answer in shared repository A 114, and shared repository A 114 is a collection of frequently asked questions and answers for Mobile Device Company A, cross-search engine 132 may, through user interface B 126, provide the item (e.g., the question and answer) along with an indication that the item was located in a database of Mobile Device Company A.

Cross-search engine 132 monitors user actions and updates share factors (step 225). In other words, cross-search engine 132 monitors interactions between a user and the identified items, and cross-search engine 132 updates the share factor information in cross-search repository 134 accordingly. In an embodiment, interactions monitored by cross-search engine 132 include whether an identified item is provided to a user and whether a provided item is selected by a user.

In an embodiment, where an item is provided to a user and the user selects the item through the user interface, the values of D and S of the share factor (S/D) for the particular item (i.e., the number of times the item is provided to a user and the number of times the item is selected by a user, respectively) are each increased by 1. Where an item is provided to a user and the user does not select the item, the value of D is increased by 1 and the value of S is not adjusted. As an example, where cross-search engine 132 determines that FAQ B item (from an example discussed in step 215) is provided to a user of shared repository A 126 and is selected by the user, and the share factor of FAQ B item for shared repository A 126 is (5/20), or 0.25, cross-search engine 132 updates the share factor information for FAQ B item by increasing the values of both S and D by 1, which updates the share factor to (6/21), or 0.286.

In an embodiment, the share factor for a particular item are additionally updated by accounting for the rank of the item relative to the other items provided to the user. For example, where an item is provided to a user and selected by the user, and the item is ranked tenth (e.g., the item is provided to the user lower than nine other items through the user interface), the share factor for the item is updated to a greater value than if the item were ranked first and the user selected the item.

In an embodiment, where the share factor for a particular is updated, cross-search engine 132 reduces the influence of older, less accurate data on the share factor by applying a constant with a value less than 1 to the share factor.

As an example, where an item is provided to a user and the user selects the item through the user interface, the value of D of the share factor (S/D) for the item may be updated according to the following algorithm: $D'=[(D+1)*(1-\varepsilon)]+R$, where "D'" is the updated value of D, "$\varepsilon$" is a small constant (e.g., 0.00001), and "R" is the rank of the item. The value of S of the share factor (S/D) for the item may be updated according to the following algorithm: $S'=[(S+1)*(1-\varepsilon)]+(R*p)$, "S'" is the updated value of S, "c" is a small constant (e.g., 0.00001), "R" is the rank of the item, and "p" is a variable with a value of 1 where the item is selected by the user (as in this example) or a value of 0 where the item is provided to the user but is not selected.

In an alternative embodiment, the values of D and S of the share factor (S/D) for the particular shared repository containing the item (i.e., the number of times any item of the shared repository is provided to a user and the number of times any item of the shared repository is selected by a user, respectively) are each similarly updated.

Figure 3:
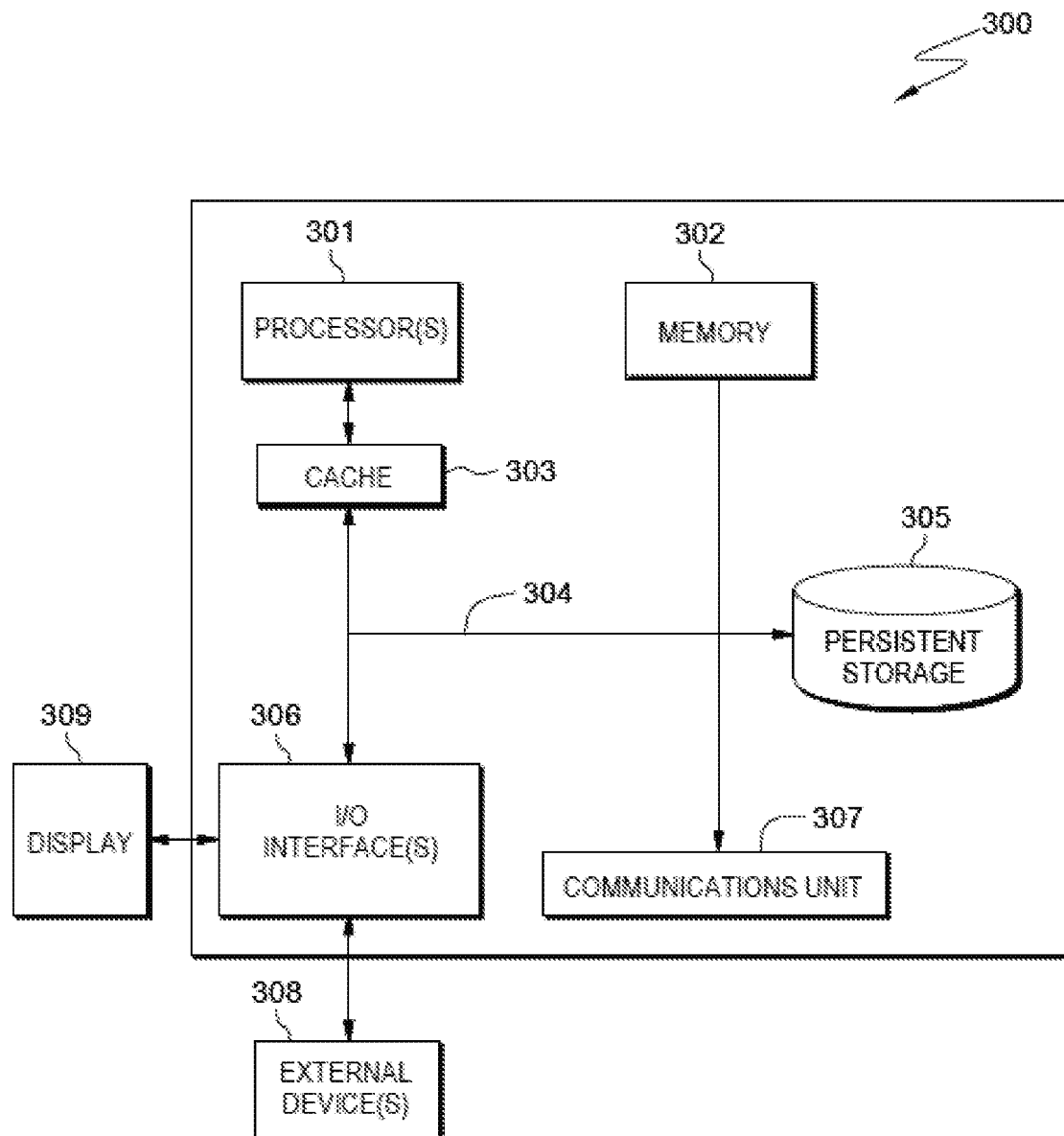
FIG. 3 is a block diagram of components of the server devices of FIG. 1, which includes cross-search engine 132, in accordance with an embodiment of the present invention.

FIG. 3 depicts computing system 300, which illustrates components of server device A 110, server device B 120, and server device C 130, which includes cross-search engine 132. Computing system 300 includes processor(s) 301, cache 303, memory 302, persistent storage 305, communications unit 307, input/output (I/O) interface(s) 306, and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 may be implemented with one or more buses or a crossbar switch.

Memory 302 and persistent storage 305 are computer readable storage media. In an embodiment, memory 302 includes random access memory (RAM) (not shown). In general, memory 302 may include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 through I/O interface(s) 306. I/O interface(s) 306 also connect to display 309.

Display 309 provides a mechanism to display data to a user and may be, for example, a computer monitor.

The descriptions of the various embodiments of the present invention have been presented for purposes of illustration, but are not intended to be exhaustive or limited to the embodiments disclosed. Modifications and variations of the presented embodiments will be apparent to those of ordinary skill in the art without departing from the scope and spirit of the invention. The terminology used herein was chosen to best explain the principles of the embodiment, to best explain the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method performed at one or more computer processors, comprising:
   receiving a plurality of search results, comprising:
      a first set of search results from a first search engine searching a first shared repository; and
      a second set of search results from a second search engine searching a second shared repository;
   assigning a first search score to each search result of the plurality of search results based on a match between a search query and each search result;
   determining a factor for each search result of the second set of search results;
   updating the factor for each search result of the second set of search results by:
      determining whether each search result of the second set of search results is selected by the user;
      responsive to determining that a search result of the second set of search results is selected by the user, increasing, by one or more computer processors, the factor proportionally to an order in which the search result is displayed; and
      responsive to determining that a search result from the second set of search results is not selected by the user, decreasing, by one or more computer processors, the factor inversely proportionally to the order in which the search result is displayed;
   determining a second search score for each of the second set of search results, wherein:
      the second search score comprises the first search score associated with each search result multiplied by the factor associated with each search result; and
   returning the plurality of search results through the cross-search engine according to a rank based on the first search score and the second search score.

2. The method of claim 1, wherein updating the factor for each search result of the second set of search results comprises:
   decreasing, by one or more computer processors, the factor by a value to reduce influence of past data on the factor, wherein the value is a same value for each factor of each search result of the second set of search results.

3. The method of claim 1, wherein the first search engine and the second search engine correspond to an information source containing frequently asked questions and answers.

4. The method of claim 1, wherein:
   the factor is inversely proportional to a number of times each search result of the second set of search results from the second shared repository is displayed to the user in response to the search query, and
   the factor is proportional to a number of times each search result of the second set of search results from the second shared repository is selected by the user.

5. The method of claim 1, further comprising:
   directing the first search engine to perform a first search of the search query in the first shared repository;
   directing the second search engine to perform a second search of the search query in the second shared repository.

6. A computer program product comprising:
   one or more computer readable storage media; and
   program instructions stored on the one or more computer readable storage media, the program instructions comprising:
      program instructions to receive a plurality of search results at a cross-search engine, comprising:
         a first set of search results from a first search engine searching a first shared repository; and
         a second set of search results from a second search engine searching a second shared repository;
      program instructions to assign a first search score to each search result of the plurality of search results based on a match between a search query submitted to the first search engine and each search result;
      program instructions to determine a factor for each search result of the second set of search results;
      program instructions to update the factor for each search result of the second set of search results using:
         program instructions to determine whether each search result of the second set of search results is selected by the user;
         program instructions, responsive to determining that a search result of the second set of search results is selected by the user, to increase the factor proportionally to an order in which the search result is displayed; and
         program instructions, responsive to determining that a search result of second set of search results is not selected by the user, to decrease the factor inversely proportionally to the order in which the search result is displayed;
      program instructions to determine a second search score for each of the second set of search results, wherein:
         the second search score comprises the first search score associated with each search result multiplied by the factor associated with each search result; and
      program instructions to return the plurality of search results through the cross-search engine according to a rank based on the first search score and the second search score.

7. The computer program product of claim 6, wherein the program instructions to update the factor for each search result of the second set of search results comprise:
   program instructions to decrease the factor by a value to reduce influence of past data on the factor, wherein the value is a same value for each factor of each search result of the second set of search results.

8. The computer program product of claim 6, wherein the first search engine and the second search engine correspond to an information source containing frequently asked questions and answers.

9. The computer program product of claim 6, wherein:
the factor is inversely proportional to a number of times each search result of the second set of search results from the second shared repository is displayed to the user in response to the search query, and
the factor is proportional to a number of times each search result of the second set of search results from the second shared repository is selected by the user.

10. The computer program product of claim 6, further comprising program instructions, stored on the one or more computer readable storage media, to:
direct the first search engine to perform a first search of the search query in the first shared repository;
direct the second search engine to perform a second search of the search query in a second shared repository.

11. A computer system comprising:
one or more computer processors;
one or more computer readable storage media; and
program instructions, stored on the one or more computer readable storage media, for execution by at least one of the one or more computer processors, the program instructions comprising:
program instructions to receive a plurality of search results at a cross-search engine, comprising
a first set of search results from a first search engine searching a first shared repository; and
a second set of search results from a second search engine searching a second shared repository;
program instructions to assign a first search score to each search result of the plurality of search results based on a match between a search query submitted to the first search engine and each search result;
program instructions to determine a factor for each search result of the second set of search results;
program instructions to update the factor for each search result of the second set of search results using:
program instructions to determine whether each search result of the second set of search results is selected by the user;
program instructions, responsive to determining that a search result of the second set of search results is selected by the user, to increase the factor proportionally to an order in which the search result is displayed; and
program instructions, responsive to determining that a search result of second set of search results is not selected by the user, to decrease the factor inversely proportionally to the order in which the search result is displayed;
program instructions to determine a second search score for each of the second set of search results, wherein:
the second search score comprises the first search score associated with each search result multiplied by the factor associated with each search result; and
program instructions to return the plurality of search results through the cross-search engine according to a rank based on the first search score and the second search score.

12. The computer system of claim 11, wherein the program instructions to update the factor for each search result of the second set of search results comprise:
program instructions to decrease the factor by a value to reduce influence of past data on the factor, wherein the value is a same value for each factor of each search result of the second set of search results.

13. The computer system of claim 11, wherein the first search engine and the second search engine correspond to an information source containing frequently asked questions and answers.

14. The computer system of claim 11, wherein:
the factor is inversely proportional to a number of times each search result of the second set of search results from the second shared repository is displayed to the user in response to the search query, and
the factor is proportional to a number of times each search result of the second set of search results from the second shared repository is selected by the user.

* * * * *